Patented July 14, 1942

2,289,878

UNITED STATES PATENT OFFICE 2,289,878

PROCESS OF PREPARING SOLUTIONS OF 2-MERCAPTOBENZIMIDAZOLE 5 - ARSINE OXIDES

Alfred Fehrle, Bad Soden-in-Taunus, and Walter Herrmann and Friedrich Hampe, Frankfort-on-the-Main, Germany, assignors to Winthrop Chemical Company, Inc., New York, N. Y., a corporation of New York No Drawing. Application October 3, 1940, Serial No. 359,553. In Germany May 6, 1938

1 Claim. (Cl. 260—300)

The present invention relates to solutions of aryl arsine oxides sparingly soluble in water and to a process of preparing them and is a continuation-in-part of U. S. application Serial No. 271,510, filed May 3, 1939, for "Solutions of aryl arsine oxides sparingly soluble in water and process of preparing them" in the name of Alfred Fehrle, Walter Herrmann and Friedrich Hampe.

Most of the aromatic arsine oxides are insoluble in water; in other cases the salts are soluble in water but they are dissociated to such an extent that the solutions have either an acid or an alkaline reaction so that they cannot be used as medicine to be administered parenterally.

Now we have found that polyhydric aliphatic alcohols such as glycerol, ethylene glycol, propylene glycol, diglycol, polyglycol, beta,beta'-dihydroxy-diethyl sulfide are excellent solvents or agents promoting solution for such arsine oxides.

The arsine oxides may be directly dissolved in the solvent, if desired by heating, and may be diluted with water, if necessary. A mixture of different polyhydric alcohols may also be used for the dissolution.

It is possible, for instance, to dissolve arsine oxides of acid or alkaline character in water together with a base or an acid, to add a polyhydric alcohol and to completely neutralize the solution without separating the arsine oxide. On neutralizing, however, the aqueous solution without the addition of a polyhydric alcohol, separation of the oxide occurs at once.

The arsine oxide with the base or the acid may also be directly dissolved in the polyhydric alcohol without any water.

Another modification of the process is to produce the arsine oxide in a polyhydric alcohol by reduction of the corresponding arsonic acid, preferably with the aid of sulfur dioxide. In this case it is only necessary to remove the excess of reducing agent and to neutralize the sulfuric acid formed in order to obtain a solution ready for use.

The solutions serve as medicine against infectious diseases.

The following examples serve to illustrate the invention, but they are not intended to limit it thereto:

(1) 10 grams of para-glycolylaminobenzene arsine oxide are dissolved in 500 cc. of hot ethylene glycol. The solution is filled up with water or ethylene glycol so as to obtain 1 liter. The solution is colorless and stable. Instead of ethylene glycol there may be used propylene glycol or a mixture of different polyhydric alcohols.

(2) 10 grams of 2-mercaptobenzimidazole-5-arsine oxide are dissolved with the necessary amount of caustic soda solution in about 300 cc. of water. 500 cc. of glycerol are added, the solution is neutralized to a pH value of 7 to 8 by means of dilute acetic acid, filled up with water so as to obtain 1 liter of liquid and filtered, if desired. The arsine oxide solution is colorless and stable.

On neutralizing the solution without the addition of glycerol the arsine oxide precipitates before the alkaline reaction to phenolphthalein has vanished.

In the same manenr 2-mercaptobenzimidazole-4-arsine oxide or 1-methyl-2-mercaptobenzimidazole-5-arsine oxide or para-glycolylaminophenyl arsine oxide may be dissolved.

(3) 10 grams of para-aminobenzene arsine oxide are dissolved with the adequate amount of hydrochloric acid in 300 cc. of water. 500 cc. of β,β'-dihydroxydiethyl sulfide are added, the solution is neutralized to a pH value of 6 to 7 by means of caustic soda solution and filled up with water so as to obtain 1 liter. A clear colorless solution is formed.

On neutralizing the aqueous solution without the addition of a polyhydric alcohol the oxide separates at once nearly completely.

(4) 4.5 grams of para-glycolylamino-(crotonylester)-benzene arsonic acid (U. S. Patent No. 1,070,146, Example 4) are dissolved at about 70° C. in 100 cc. of glycol. After 1 gram of sodium iodide has been added, sulfur dioxide is introduced in the cold until the solution is saturated. The excess of sulfur dioxide is dispelled by the introduction of carbon dioxide. The solution is then neutralized by means of caustic soda solution and filled up with water or glycol so as to obtain 200 cc. A colorless solution containing 0.4 per cent of arsenic is formed.

(5) 3.7 grams of 3-amino-4-hydroxyethoxybenzene arsonic acid are dissolved, while gently heating, in pure glycerol or in a solution of glycerol of 50 per cent strength. After 1 gram of sodium iodide has been added sulfur dioxide is introduced in the cold until the solution is saturated. The excess of sulfur dioxide is dispelled by the introduction of carbon dioxide. The solution is then neutralized by means of caustic soda solution and filled up with water or glycerol so as to obtain 200 cc. A colorless solution containing 0.4 per cent of arsenic is formed.

(6) 10 grams of 3-acetylamino-4-hydroxybenzene-1-arsine oxide are dissolved in ethylene glycol while heating. After cooling, the liquid is filtered and diluted with ethylene glycol so as to obtain 1 liter.

Instead of ethylene glycol there may be used propylene glycol, diglycol or glycerol.

The solution may be diluted with about the same volume of water without separating the arsine oxide.

(7) 10 grams of 2-mercaptobenzimidazole-5-arsine oxide are dissolved, while heating, in propylene glycol. The solution is treated as described in Example 6 so as to obtain 1 liter of liquid. Instead of propylene glycol there may be used diglycol or polyglycol.

In the same manner 2-mercaptobenzimidazole-4-arsine oxide or 1-methyl-2-mercaptobenzimidazole-5-arsine oxide or para-glycolylaminophenyl arsine oxide may be dissolved.

(8) 27.4 grams of 2-mercaptobenzimidazole-5-arsonic acid are dissolved in 350 cc. of water with 7.5 cc. of caustic soda solution of 42° Bé. 400 cc. of glycerol are added and the solution is neutralized by means of hydrochloric acid until it shows a feebly acid reaction. After 5 grams of sodium iodide have been added, sulfur dioxide is introduced, while cooling, until the solution is saturated; the solution is then allowed to stand for several hours. As in Example 5, the excess of sulfur dioxide is then dispelled by the introduction of carbon dioxide, the solution is neutralized by means of caustic soda solution and filled up with dilute glycerol so as to obtain the desired concentration.

We claim:

The proces of preparing a solution of 2-mercaptobenzimidazole-5-arsine oxide which comprises reducing by means of sulfur dioxide 2-mercaptobenzimidazole-5-arsonic acid dissolved in a solvent selected from the group consisting of glycerol and water containing glycerol.

ALFRED FEHRLE.
WALTER HERRMANN.
FRIEDRICH HAMPE.